(12) United States Patent
Pace et al.

(10) Patent No.: US 8,493,263 B2
(45) Date of Patent: Jul. 23, 2013

(54) SHORT BASELINE HELICOPTER POSITIONING RADAR FOR LOW VISIBILITY USING COMBINED PHASED ARRAY AND PHASE DIFFERENCE ARRAY RECEIVERS

(75) Inventors: Nicholas G. Pace, Bath (GB); Jacques Y. Guigné, Paradise (CA); Andre A. Pant, Paradise (CA)

(73) Assignee: Intelligent Sciences, Ltd., Paradise, NL (CA)

( * ) Notice: Subject to any disclaimer, the term of this patent is extended or adjusted under 35 U.S.C. 154(b) by 141 days.

(21) Appl. No.: 13/170,680

(22) Filed: Jun. 28, 2011

(65) Prior Publication Data

US 2013/0002473 A1 Jan. 3, 2013

(51) Int. Cl.
*G01S 13/00* (2006.01)
(52) U.S. Cl.
USPC ............... 342/33; 342/36; 342/118; 342/146
(58) Field of Classification Search
USPC ............. 342/33–40, 118, 127–133, 146, 147
See application file for complete search history.

(56) References Cited

U.S. PATENT DOCUMENTS

| 3,659,085 | A * | 4/1972 | Potter et al. ................... 701/518 |
| 5,596,330 | A * | 1/1997 | Yokev et al. .................. 342/387 |
| 5,699,069 | A * | 12/1997 | Faulkner ........................ 342/352 |
| 7,633,429 | B1 * | 12/2009 | Liu et al. ........................ 342/33 |
| 2005/0035897 | A1 * | 2/2005 | Perl et al. ....................... 342/29 |
| 2007/0290919 | A1 * | 12/2007 | Carpenter ...................... 342/38 |
| 2008/0150790 | A1 * | 6/2008 | Voigtlaender et al. ........ 342/127 |
| 2009/0303102 | A1 * | 12/2009 | Weedon ......................... 342/38 |
| 2012/0127015 | A1 * | 5/2012 | Weedon ......................... 342/38 |

* cited by examiner

*Primary Examiner* — Jack W Keith
*Assistant Examiner* — Marcus Windrich
(74) *Attorney, Agent, or Firm* — Richard A. Fagin

(57) ABSTRACT

A helicopter position location system includes a receiver located substantially in a center of an array of receivers. A first array of receivers is located in a selected pattern separated from the center receiver by a first distance. Selected receivers in the first array are spaced apart from each other by at most one half wavelength of a base frequency of a locator signal transmitted from a helicopter. A second array of receivers is located in a selected pattern by a second distance larger than the first distance. A transmitter on the transmits a signal having a base frequency and a plurality of hop frequencies A processor in signal communication with the receivers is configured to determine phase difference with respect to frequency between any pair of receivers, to determine time delay of arrival based on the phase difference with respect to frequency, to beam steer response of the selected receivers, and to use the beam steered response and time delay of arrival between pairs of receivers to determine a position of the helicopter.

4 Claims, 4 Drawing Sheets

SHORT BASELINE HELICOPTER POSITIONING RADAR FOR LOW VISIBILITY USING COMBINED PHASED ARRAY AND PHASE DIFFERENCE ARRAY RECEIVERS

CROSS-REFERENCE TO RELATED APPLICATIONS

U.S. patent application Ser. No. 12/768,793, filed on 28 Apr. 2010 and commonly owned with the present invention contains subject matter related to the subject matter of the present invention.

STATEMENT REGARDING FEDERALLY SPONSORED RESEARCH OR DEVELOPMENT

Not applicable.

BACKGROUND

The invention relates generally to the field of rotating wing aircraft (e.g. helicopter) position and orientation determination using radar. More specifically, the invention relates to devices and methods applied to enhance safety of helicopter landing under brownout (sand and/or dust) or whiteout (snow and/or fog) conditions created by the aircraft's main-rotor down-wash, under which near-ground flight is particularly perilous due to the sudden loss of visual cues on which the pilot depends.

United States Defense Advanced Research Projects Agency (DARPA) Broad Agency Announcement No. BAA 06-45 requests solicitations for proposals to deal with affordable solutions to the problem of helicopter landing in brownout as well as other degraded visual environments (DVEs) such as whiteouts caused by snow and/or fog. Solutions are needed for the brownout phenomenon, which causes deadly accidents during helicopter landing and take-off operations in arid desert terrain. Intense, blinding dust clouds, which may be stirred up by the aircraft's main-rotor down-wash during near-ground flight can cause helicopter pilots to suddenly lose all visual cues. This creates significant flight safety risks from aircraft and ground obstacle collisions, rollover due to sloped and uneven terrain, etc.

What is needed is a sensor/visualization-display system that will effectively provide an affordable, landing capability in brownout/DVE conditions where the visibility is temporarily as low as zero with zero landing-zone infrastructure and limited knowledge of the terrain comprising the landing area. The invention may also be permanently deployed as an integral safety feature for landing areas experiencing frequent degradation of visibility such as offshore oil rigs (e.g. fog), desert installations (e.g. sand and dust) and Arctic/Antarctic installations (e.g. snow).

SUMMARY OF THE INVENTION

A helicopter position location system according to one aspect of the invention includes a receiver located substantially in a center of an array of receivers. A first array of receivers is located in a selected pattern separated from the center receiver by a first distance. Selected receivers in the first array are spaced apart from each other by at most one half wavelength of a base frequency of a locator signal transmitted from a helicopter. A second array of receivers is located in a selected pattern by a second distance larger than the first distance. A transmitter on the helicopter transmits a signal having a base frequency and a plurality of hop frequencies A processor in signal communication with the receivers is configured to determine phase difference with respect to frequency between any pair of receivers, to determine time delay of arrival based on the phase difference with respect to frequency, to beam steer response of the selected receivers, and to use the beam steered response and time delay of arrival between pairs of receivers to determine a position of the helicopter.

Other aspects and advantages of the invention will be apparent from the description and claims which follow.

DETAILED DESCRIPTION

Figure 1:
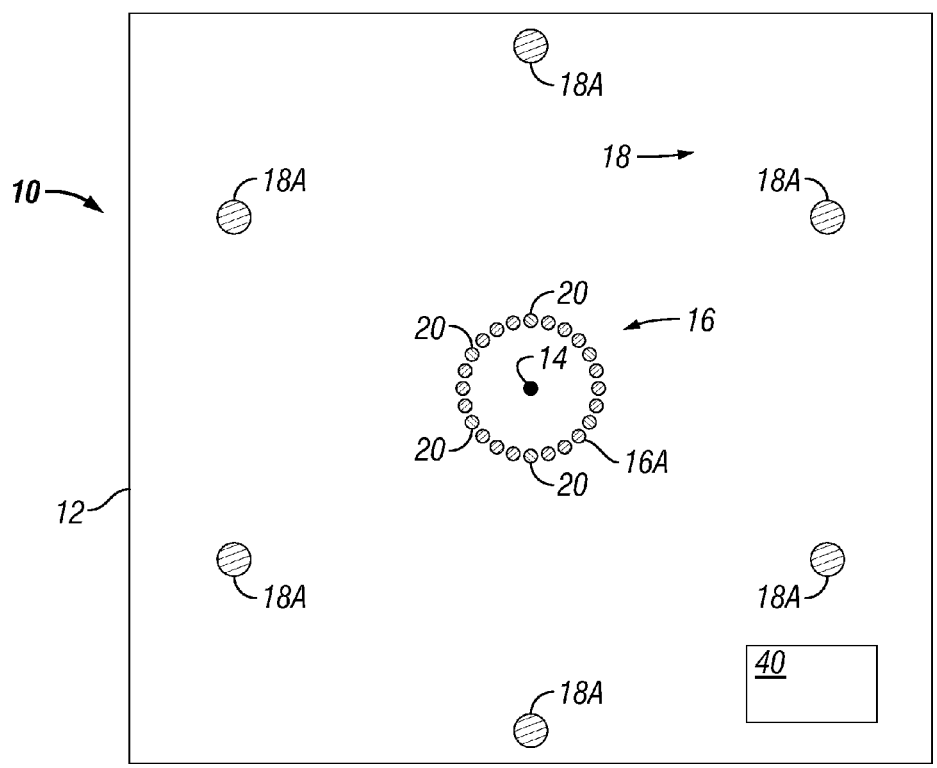
FIG. 1 is an example layout of a ground based combined receiver array.

FIG. 1 shows a top down view of one possible manifestation of a hybrid phase difference/phased array. The hybrid array 10 may be disposed on a mat or pad 12, or may have individual components mounted in the ground. The hybrid array 10 may include one central reference receiver 14; an inner phased array (PA) 16 for determining direction of arrivals. The inner phased 16 array may include 24 receivers 16A spaced at about ½ λ between them, on a radius of 2λ (25 cm at 2.4 GHz ISM frequency). The hybrid array 10 may include an outer phase difference array 18 (PDA) for long range position determination. In the present example, the outer phase difference array 18 may include six receivers 18A positioned on a radius 10λ (125 cm at 2.4 GHz) from the central reference receiver 14. The hybrid array may also include an inner phased array (PA) for short range position determination. The inner PA 16 may include six receivers 20 interspaced between the receivers 16 used for close proximity positioning. A computer or dedicated processor and transmitter 40 may calculate the helicopter position and transmit the position information to a helicopter (H in FIG. 2) so that the pilot can determine his position with respect to the combined array 10 for safe landing.

In the present invention it is proposed to transmit from the helicopter a frequency hopping signal. If the phase difference between two points on the ground is measured as a function of the hop frequency then its slope is essentially the difference in arrival time at the two points.

Figure 2:
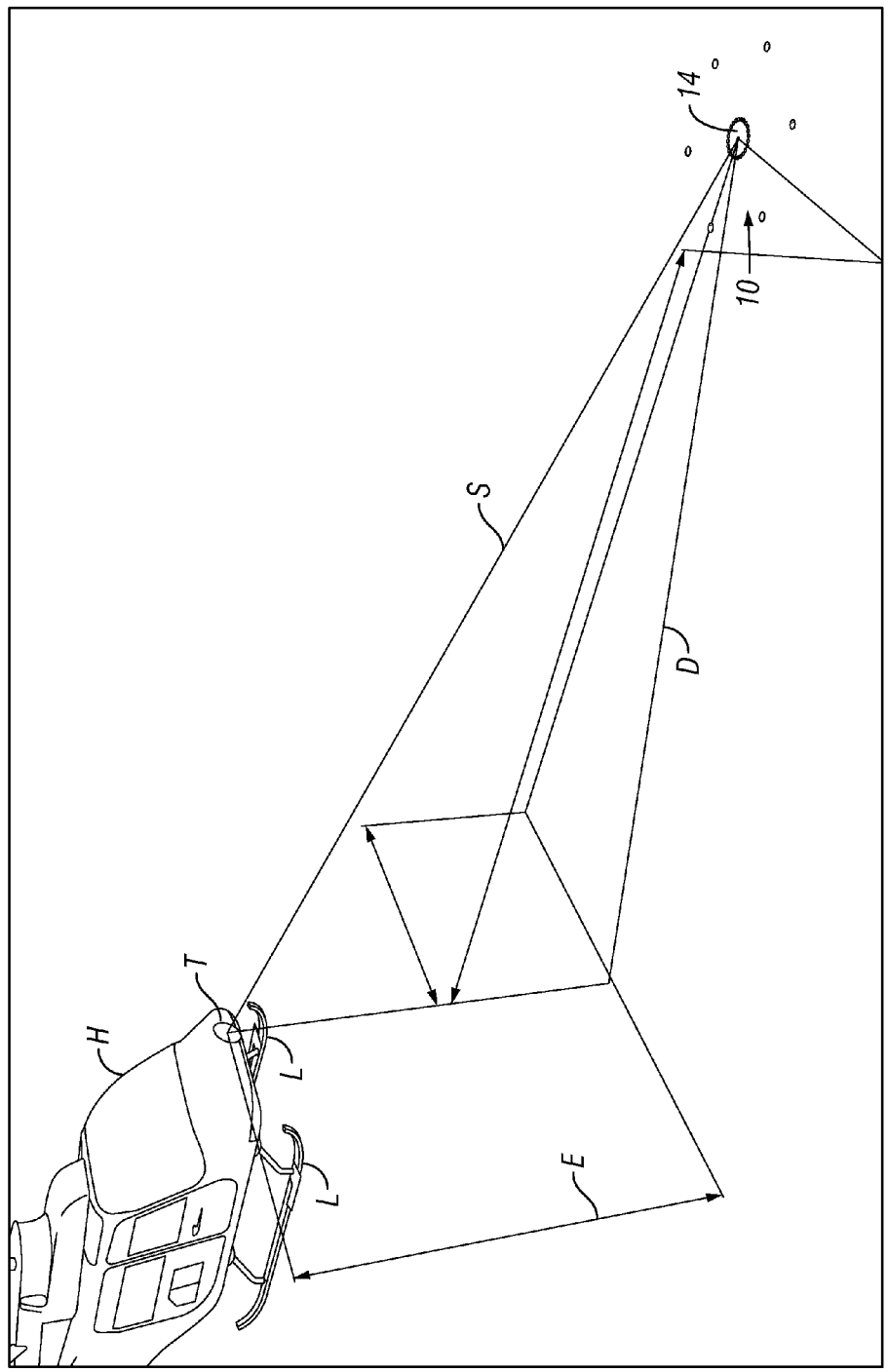
FIG. 2 shows an example helicopter with an ISM band transmitter and the receive array of FIG. 1 to illustrate an example embodiment of helicopter position determination according to the invention.

FIG. 2 shows an example helicopter H approaching the combined array 10. Elevation of the helicopter H from the ground level is shown at E, and the horizontal distance of the helicopter H from the center receiver 14 in the combined array is shown at D. The helicopter H may include a transmitter T located on a convenient part of the helicopter H body. In the present example, the transmitter T is located on the nose of the helicopter H, but such location is not a limitation on the scope of the invention. It is only necessary to know the relationship between the position of the transmitter T and the location of the landing pads L on the helicopter H to use the invention. It will be appreciated that the helicopter H is typically equipped with pitch, roll and yaw sensors so that when landing, the landing pads will be suitably level with respect to the combined array. A line of sight distance S is shown between the transmitter T and the center receiver 14 on the array. Such distance may be calculated in some examples to determine the range of the helicopter H from the center receiver 14 in the array to assist the pilot in determining position with respect to the array.

The following description is in terms of Cartesian coordinates (X,Y,Z) however it should be clearly understood that other coordinate systems may be used to equal effect, e.g., polar or cylindrical coordinates.

In the present invention, the transmitter T may emit a base signal, for example in the ISM band (2.4 GHz) and a plurality of signals including "hop" frequencies so that a relationship between frequency and phase may be determined for selected ones of the receivers (e.g., 14, 20 and 18A in FIG. 1). The phase difference between the received signal at each such receiver and the center receiver 14 may be determined at a plurality of hop frequencies. The relationship between phase difference and hop frequency may be used to determined time difference of arrival (TDOA) between the center receiver and any one or more of the selected receivers (e.g., 14, 20 and 18A in FIG. 1). Given that the TDOA within the combined array is available then in principle this information can provide the position of the helicopter H with respect to the center receiver 14 in the combined array 10.

The extraction of the helicopter position from the time TDOA is available in principle from what are termed the multilateration equations. Usually the form of the multilateration equations requires that the receivers are not all coplanar with the ground surface. However, it can be shown that even if the receivers are coplanar then multilateration equations can provide at least the x, y position, and a slant range from which X,Y,Z may all be obtained. It is shown that the extraction of slant range from the multilateration equation may be much more sensitive to errors in the delays than the method proposed here and used thus far termed the intercept method.

The present position extraction process may be performed in the presence of multipath arrivals and inherent phase noise.

As previously stated location of the transmitter (T in FIG. 1) with respect to the central receiver (14 in FIG. 1) can be viewed as either the determination of Cartesian coordinates X,Y,Z or equivalently as the determination of, for example, $\theta \phi R$, i.e., two angles and the range (S in FIG. 2). In the present example determination of the two angles precedes the determination of R, x, y and hence z.

Given a spatially diverse array of receivers as shown in FIG. 1, the phase of the received signal at a particular frequency at each receiver may be combined to form a beam. By applying suitable phase shift to the output of each receiver the beam may be steered. If the spacing between receivers is not greater than a half wavelength at the chosen frequency then a beam with a single maximum is formed whose steer direction provides both $\theta$ and $\phi$. If the spacing between receivers is greater than a half wavelength, then secondary beams or "diffraction secondaries" are formed and the correct values of $\theta$ and $\phi$ are no longer unambiguously determinable.

If the spatial extent of the array of receivers is sufficiently large in terms of the range to the transmitter T, then the angles to the transmitter T from different origins within the combined array 10 can be obtained by the beam steering technique and the range can then be determined for a sufficiently large radius array.

For this beamforming/steering approach to be possible, the requirement for inter-receiver spacing to be not greater than a half wavelength requires are large number of receivers. In such a case there may be 130 receivers around the circumference of a circle of radius 10 wavelengths in order to perform the beamforming/steering.

The proposed example implementation, described below, however, requires only a minimum of 32 sensors. Two circular arrays of receivers may be used as shown in FIG. 1. The outer circle of receivers has a radius of 10 wavelengths and has 6 sensors around its circumference. The inner circle of receivers 16 has a radius of 2 wavelengths and has approximately 25 to 30 receivers around its circumference. A central reference sensor 14 is also part of the combined receiver array. In the present example, the reduced number of receivers is an important factor in the cost, in terms of both financial cost of the combined array and the required operating and computing power needed to make helicopter position determination Making full use of the frequency hopping signals allows such relatively sparse arrays to be used. As explained above, phase difference measurements between one receiver and the others in relation to the frequency of the received signals allows the TDOA between any two receivers to be obtained.

In principle, the three values of X,Y,Z can be obtained from three independent determinations of TDOA between pairs of receivers. However in practice, noise and the presence of multipath signal travel (e.g., from reflections from objects in the transmitter signal path) require more than three spatially decorrelated measurements.

The extraction of the TDOA from phase difference measurements with frequency presents a basic problem. Phase difference measurements can in practice only be made in the interval 0 to $2\pi$. The slope of this measured phase difference with respect to frequency will give the TDOA. However, in practice, multipath arrivals in addition to the direct signal are present and thus complicate the relation of phase difference with respect to frequency These multipath signals are those that leave the transmitter (T in FIG. 2) on the helicopter (H in FIG. 2) at the same time as the direct arrival signals are detected at each receiver but have traveled via scatter from nearby objects and from the ground via the helicopter H and arrive later in time and with different amplitudes and phases compared to the direct arrival signals.

Multipath arrivals result in departures of the measured phase difference from its otherwise linear relation with frequency. A best fit slope of the measured phase difference versus frequency in a multipath environment may result in unacceptable TDOA errors.

However, it is known that the phase difference of a signal at zero frequency must be zero. Leveraging of the zero frequency point allows a best fit slope of phase difference with respect to frequency to provide the TDOA to within acceptable accuracies even in the presence of multipath arrivals.

In order to take advantage of the leverage the measured phase differences must also be unwrapped, because the measurable phase limit is limited to $2\pi$. This requires finding the correct multiple of $2\pi$ to be added/subtracted to the measured phase difference values in order to determine the correct phase difference.

The phase unwrapping process is based on the differences between the measured phase difference and the theoretical phase difference of a transmitter in the far field being significantly less than $2\pi$.

In order to estimate the far field phase differences, only the angles to the transmitter T are required to be determined. Although these angles can be extracted from the measured data via an optimization process, in the presence of multipath arrivals, the method is prone to errors. However, a number of the receivers in the array can be used to directly measure the angles via beamforming, which is robust in the presence of multipath arrivals. Direct measurement of angles using beamforming may be performed using receivers in the inner array of receivers 16.

Once the phase differences versus frequency are unwrapped such that the slope of the line of phase difference with respect to frequency passes through zero at zero frequency, the TDOA can be obtained with sufficient accuracy to allow the X and Y coordinates of the transmitter T to be extracted using the multilateration equations and the range via a polynomial fit as explained below.

It can be shown that if the slant range to the helicopter H height is small, incorrect extractions of coordinates occur which may be corrected by using the phase difference data obtained using a number of (6) receiver pairs of the 24 receivers available in the inner array (16 in FIG. 1).

Using two concentric arrays of receivers as shown in FIG. 1 with a central reference sensor 14, the position of a helicopter (H in FIG. 2) can be obtained to an accuracy of less than one meter at elevations and ranges up to 400 meters. The TDOA values, as explained above, are obtained by a measurement of phase differences with respect to frequency using a frequency hopping signal from the transmitter (T in FIG. 2). The system is not constrained by any particular base transmitter frequency, though in the present example the frequency hops are 0.5 MHz or less covering a frequency range of 80 MHz to around 2.4 GHz (the ISM band).

The receiver array disposed on the ground is preferably placed in the vicinity of the center of the landing area of the helicopter. By way of explanation, the outer ring of receivers (18 in FIG. 1) contains a number, $N_1$, of receivers, which may be equally spaced around the circumference, so:

$$\alpha_i = (i-1)*360/N_1 \tag{1}$$

and the receiver positions in the outer ring 18 may be defined by the expression:

$$x_i = r_1 \cos(\alpha_i) \tag{2}$$

$$y_i = r_1 \sin(\alpha_i) \tag{3}$$

where, $i=1:N_1$

The inner ring 16 of receivers contains a number, $N_2$, of receivers, which may also be equally spaced around the circumference of the inner ring, so that:

$$\beta_j = (j-1)*360/N_2 \tag{4}$$

The outer ring 18 may contain 6 receivers in the present example and the receivers thereon are used for the range determination.

The transmitter T on the helicopter H is at a position defined by:

$$X = R \cos\theta \sin\phi \tag{5}$$

$$Y = R \sin\theta \sin\phi \tag{6}$$

$$Z = R \cos\theta \tag{7}$$

with reference to the central receiver (14 in FIG. 1) The distance to position $(x_i, y_i)$ in the combined receiver array from the transmitter T may be defined by the expression:

$$\Re_{hi} = \sqrt{(x_i-X)^2+(y_i-Y)^2+Z^2} \tag{8}$$

The foregoing distance determines the phase of the direct signal reaching any selected receivers based on the receiver position in the combined array. The amplitude of the direct signal arriving at all receivers will be taken as equal to $A/\Re_{hi}$.

In the presence of scattering objects the transmission of the signal from the transmitter T travels to such scatterer and then from the scatterer to one or more receivers.

The position of a scatterer may be defined as $(x_s, y_s, z_s)$ and so the distance from transmitter T to such scatterer may be defined as $$\Re_{hs} = \sqrt{(x_s-X)^2+(y_s-Y)^2+(z_s-Z)^2} \tag{9}$$

And the distance from the scatterer to any selected receiver may be defined as:

$$\Re_{si} = \sqrt{(x_s-x_i)^2+(y_s-y_i)^2+(z_s)^2} \tag{10}$$

The output of any selected receiver i at a given time will be the linear superposition of all the signal arrivals (both directed and scattered) at that time.

$$S_i e^{j\psi_i} = S_{direct} + S_{scattered} \tag{11}$$

$$S_i e^{j\psi_i} = \tag{12}$$

$$\frac{A}{R_{hi}} e^{j(kR_{hi}+\Phi)} + \sum_{s=1:N_s} \frac{A\sqrt{(ts_s)}}{(R_{hs}R_{si})_s} e^{j(-\Phi_{s1}+kR_{si})} + \sqrt{I_{si}} e^{j(\Phi_{s2}+kR_{hi})}$$

where s identifies one of $N_s$ scatterers, and $\Phi_{s1}$ and $\Phi_{s2}$ are random phases. $I_{si}$ is the intensity of the signal arriving via the multipath helicopter-ground-helicopter-receiver i and $ts_s$ is the target strength associated with the scatterer s. $\Phi$ is the initial phase at the transmitter T. A is the initial amplitude of the transmitted signal and will not appear in the phase difference between arrivals at sensor i and that at the central receiver 14.

The output of the central receiver 14 may be defined by the expression:

$$S_0 e^{j\psi_0} = \tag{13}$$

$$\frac{A}{R_{hi}} e^{j(kR_{h0}+\Phi)} + \sum_{s=1:N_s} \frac{A\sqrt{(ts_s)}}{(R_{hs}R_{s0})_s} e^{j(-\Phi_{s0}+kR_{si})} + \sqrt{I_{s0}} e^{j(\Phi_{s2}+kR_{h0})}$$

Thus the phase difference between the outputs of receiver i and the central receiver 14 may be defined by the expression:

$$\Delta\phi_{i0} = \text{angle}\left(\frac{S_i e^{j\psi_i}}{S_0 e^{j\psi_0}}\right) \tag{14}$$

In simulations of operation of the present invention, phase noise was added with a standard deviation of, for example, 0.1 degrees. Thus the phase difference that is measured and processed may be defined by the expression:

$$\Delta\phi_{i0} = \text{angle}\left(\frac{S_i e^{j\psi_i}}{S_0 e^{j\psi_0}} e^{j\Phi_r}\right) \tag{15}$$

where $\Phi_r$ is a random number with zero mean and standard deviation of 0.0017 (0.1 degrees).

$I_{si}$ includes the appropriate bistatic cross section of the helicopter. This has been modelled in simulations and it has been shown that the effect of the multiple arrivals via the helicopter-ground-helicopter-receiver is expected to be negligible except possibly for highly symmetric situations, which for an actual helicopter in service are unlikely. The scatterers, other than the helicopter, were modelled for the simulations as a collection of tubes and plates each with their own $ts_s$ distributed to form a control tower structure in the close vicinity of the landing area.

The signal to reverberation ratio is defined and obtained for each helicopter position (X, Y, Z) as follows:

$$K = 10\log_{10}\left(\frac{\text{direct intensity}}{\text{multipath intensity}}\right) \quad (16)$$

The processing of the measured phase difference versus frequency uses the following procedure: (1) extract the angles, (2) unwrap the phase difference versus frequency and force it through zero at zero frequency to determine its slope, which provides the TDOA, (3) extract the range, and the X and Y coordinates, and (4) calculate Z. These stages are presented below, with any limitations explained herein.

The arrival angle to the transmitter T may be obtained from the beamforming/steering the phase difference data obtained from the inner circle of receivers (16 in FIG. 1). The two angles (direction and angular elevation) thus obtained may be used to form the expression for the far field upon which the unwrapping and range extraction are based.

The output of each receiver may be downshifted to an intermediate frequency $\omega_{IF}$ where A/D conversions can be conveniently performed in parallel channels preserving any phase relations between channels.

If the transmitter angles are $\theta$, $\phi$ then the output of receiver i is $$e^{jk(x_i \cos\theta\cos\phi + y_i \sin\theta\cos\phi)} \quad (17)$$

where the positions of the receivers are, for the example of a circular arrangement as shown in FIG. 1, the x and y coordinates may be determined from the expressions:

$$x_i = r_1 \cos(\beta_i)$$

$$y_i = r_1 \cos(\beta_i) \quad (18)$$

and $$k = \frac{2\pi}{\lambda}$$

where $\lambda$ is the wavelength at the base frequency of the transmitter T.

As the transmitter changes position $\theta$, $\phi$ change in the beam pattern is given by the expression $$B(\theta, \phi)_{unsteered} = \left|e^{j\omega_{IF}t}\sum_i e^{jk(x_i\cos\theta\cos\phi + y_i\sin\theta\cos\phi)}\right| \quad (19)$$

$$= \left|\sum_i e^{jk(x_i\cos\theta\cos\phi + y_i\sin\theta\cos\phi)}\right|$$

$$B(\theta, \phi)_{unsteered} = \left|\sum_i e^{j\gamma_i}\right| \quad (20)$$

In Eq. (20) $\gamma_i$ is the phase of the output of the i-th receiver after its output it has been downshifted, and is not directly measured but is within the data implicitly. $\gamma_i$ can equally be the phase difference between the receiver i and the central receiver 14 (or any other reference receiver).

The beam of the receivers in the inner circle 16 is now steered to angle $\theta_s$, $\phi_s$ using the expression:

$$B(\theta, \phi, \theta_s, \phi_s)_{steered} = \left|\sum_i e^{j\gamma_i} e^{-jk(x_i\cos\theta_s\cos\phi_s + y_i\sin\theta_s\cos\phi_s)}\right| \quad (21)$$

The values of $\theta_s$, $\phi_s$ which maximise $B(\theta, \phi, \theta_s, \phi_s)_{steered}$, are the angles of the transmitter T with respect to the combined receiver array (10 in FIG. 1).

In order for the foregoing procedure to work the distances between receivers in the inner circle 16 must be not greater than a half wavelength at the base transmitter frequency. For example if the receivers are arranged along the circumference of a circle, the straight line spacing must not be greater than a half wavelength regardless of the circle radius.

The accuracy of the angles determined from the above described beamforming is useful for the required phase unwrapping of the signals detected by the other receivers in the combined array 10. As the angle $\phi$ gets larger its estimate becomes less accurate and such change in accuracy affects the extraction of the range rather than the phase unwrapping. The procedure in the present example is to use the beamforming in phase unwrapping followed by range extraction. Multilateration equations are then used to determine the X and Y coordinates. The range (S in FIG. 2) and x and y are then used to obtain Z. The use of range with the angles to directly calculate X,Y,Z requires more accuracy than is available from the angles determined from the beamforming The phase unwrapping has several stages:

For each receiver pair in the combined array: (1) determine actual, measured phase differences with respect to frequency using the PDA (18 in FIG. 1); (2) use the (inner) phased array 16 to calculate the direction of arrival of the transmitter T signal.

From the foregoing determined direction, and the geometry of the PDA 18, a theoretical calculation of the phase difference of the transmission as if arriving from the far field may then be performed.

To perform such phase difference calculation, one may use an optimization routine with measurements at all hop frequencies to find a non-integer multiple of $2\pi$ that would bring the corrected phase difference as close as possible to the far field phase difference as calculated above.

Using rounding functions, the non-integer multiple of $2\pi$ may be converted to the closest integer multiple that corrects the measured phase difference to find the far field result.

Due to the presence of multiple arrivals, the multiple of $2\pi$ needed to unwrap the phase differences may not be completely independent of frequency, as it would be in the absence of multiple arrivals. This is recognized and the integer multiplier is updated via algorithms (replace $N_{i3}$ by $N_{i4}$ and then $N_{i5}$) as described in FIG. 3. The TDOA for each sensor pair may now obtained by a least squares linear fit of the unwrapped phase difference versus frequency data forced to pass through zero at zero frequency.

Now the difference between the extracted phase delay and the far field phase delay is tested. The extracted phase delay must always be greater than the far field phase delay. If a difference of incorrect sign of phase delay occurs for a particular sensor pair then the phase delay is changed by the equivalent of a $2\pi$ error in the unwrapped phase difference at the highest frequency Because of statistical errors in the measured phase differences and the angles there will be consequentially be errors in the calculated TDOAs. To allow for such errors, it has been determined that the measured delay must not only exceed the far field delay, but exceed it by a determined threshold before the phase correction occurs. The threshold used in simulations of operation of the present invention was 0.0017 and is appropriate for slant ranges less than 15 meters. 0.0017 is equivalent to a phase difference error of about 5 degrees at 2.44 GHz.

The result of this extra stage of effective phase unwrapping is that for the outer circle of receivers (18 in FIG. 1, 10 wavelength radius, 6 sensor pairs) the correct unwrapping allows the slant range to be as small as 6 m.

The extra stage of unwrapping appears to make no difference to the performance of the inner circle of receivers 16 when used for extracting the helicopter coordinates. The use of the inner circle of sensors 16 is limited to a radial distance of about 10 m and a helicopter elevation (E in FIG. 2) of about 4 m.

Further unwrapping is possible but it is not sufficiently robust nor is it necessary, provided the use of the inner array (circle of receivers) 16 is available. Any such further unwrapping takes the result of the above wherein all the delays are adjusted so they have a magnitude greater than the corresponding far field delay. It is shown below that the relation between the actual delay and the far field delay is approximately equal to:

$$d_i^{NF} = -\frac{(d_i^{FF})^2}{2R} + \left(1 - \frac{r^2}{2R^2}\right)d_i^{FF} + \frac{r^2}{2R}\left(1 - \frac{r^2}{4R^2}\right) \quad (22)$$

If the range is extracted from the intercept as described below, then the ratio of the intercept term to the non-linear coefficient obtained via the fitting process is given by the expression:

$$\frac{\frac{r^2}{2R}\left(\frac{1-r^2}{4R^2}\right)}{\frac{-1}{2R}} \cong r^2 \quad (23)$$

If the ratio is significantly different from $r^2$, which in the outer receiver circle 18 array is 1.56, then further corrections to the delays are required. This constancy of the ratio exists only for slant ranges greater than about 5 m. It can be shown that adequate provision for these short slant ranges is available using the inner receiver array (circle) 16.

The near field delay (in m) between a receiver i and the reference receiver 14 is given by the expression:

$$d_i^{FF} = R_i - R \quad (24)$$

And the far field delay is $d_i^{FF}$. Therefore $$(R_i - R)(R_i + R) = 2Rd_i^{FF} = -2Xx_i - 2Yy_i \quad (25)$$

So $d_i^{FF} = -(x_i \cos\theta \sin\phi + y_i \sin\theta \sin\phi)$ (26)

where $x_i$ and $y_i$ are the receiver coordinates (in Cartesian coordinates).

$$[d_i^{NF}]_{[d_i^{FF}=0]} = \frac{r^2}{R\left[1 + \sqrt{\left(1 + \frac{r^2}{4R^2}\right)}\right]} \quad (27)$$

A second order polynomial is fitted to the extracted values of $d_i^{NF}$ vs $d_i^{FF}$ and the constant term, $\alpha_3$, which corresponds to $[d_i^{FF}]_{[d_i^{FF}=0]}$ is found.

Optimisation of the expression maybe found by:

$$\left|a_3 - \frac{r^2}{R\left[1 + \sqrt{\left(1 + \frac{r^2}{4R^2}\right)}\right]}\right| = 0 \quad (28)$$

which provides an estimate of R. Note there are no approximations in the above process. An approximate expression shows the second order dependence:

$$d_i^{NF} = -\frac{(d_i^{FF})^2}{2R} + \left(1 - \frac{r^2}{2R^2}\right)d_i^{FF} + \frac{r^2}{2R}\left(1 - \frac{r^2}{4R^2}\right) \quad (29)$$

Thus an approximation to the intercept that can be obtained from the polynomial fit is given by the expression:

$$\frac{r^2}{2R}\left(1 - \frac{r^2}{4R^2}\right) \quad (30)$$

In practice, the following expression may be used:

$$\frac{r^2}{R\left[1 + \sqrt{\left(1 + \frac{r^2}{4R^2}\right)}\right]} \quad (31)$$

The extracted intercept from the data must be positive. If not, then it is an indication of either a rogue or a situation that needs further unwrapping.

Incorrect unwrappings may occur when the difference between the near field and far field delays are greater than one wavelength of the transmitter base frequency. This occurs in the present case of a 10 wavelength radius array when the slant range, in the absence of multipath and phase noise, is less than 6 m. When the slant range is small, the processing is preferably based on the phase difference data measured using the smaller, inner array (16 in FIG. 1).

The intercept depends on range as shown above by:

$$I = \frac{r^2}{R\left[1 + \sqrt{\left(1 + \frac{r^2}{4R^2}\right)}\right]} \quad (32)$$

The range can be expressed as:

$$R = \frac{r^2}{2I} - \frac{I}{2} \quad (33)$$

And the error in R due to an error in the intercept $\Delta I$, defined as $\Delta R$, may be given by the expression:

$$\Delta R = -\frac{1}{2}\left(\frac{r^2}{I^2} + 1\right)\Delta I \qquad (34)$$

$$\Delta R = -\left(1 + \frac{R^2}{r^2}\left(1 + \sqrt{1 + \frac{r^2}{R^2}}\right)\right)\Delta I \qquad (35)$$

The intercept decreases with range and the error in the range is sensitive inversely as the square of the intercept and proportional to errors in the intercept. These two aspects manifest themselves for certain combinations of slant range, K factor value and any bias that inappropriate hop frequency interval produces.

The multilateration equations developed below are used with the TDOA data from the unwrapped phase versus frequency to obtain X and Y coordinates Distance from transmitter T to the 6 sensors in the x-y plane may be determined by the expression:

$$R_i = \sqrt{(X-x_i)^2 + (Y-y_i)^2 + Z^2} \qquad (36)$$

Distance from the transmitter T to the central (reference) receiver 14 may be given by the expression:

$$R = \sqrt{(X^2 + Y^2 + Z^2)} \qquad (37)$$

Difference in time between arrival at the reference receiver 14 and at receiver i expressed in meters (i=1 to 6) may be given by the following expression:

$$d_i^{NF} = R_i - R \qquad (38)$$

The above may be re-express as:

$$R_i^2 = (d_i^{NF})^2 + 2d_i^{NF} R + R^2 \qquad (39)$$

And thus $$0 = d_i^{NF} + 2R + \frac{(R^2 - R_i^2)}{d_i^{NF}} \qquad (40)$$

Choosing another receiver, e.g., receiver j and write:

$$0 = d_j^{NF} + 2R + \frac{(R^2 - R_j^2)}{d_j^{NF}} \qquad (41)$$

Subtract the above two equations allows the elimination of R which removes the square root from the problem as shown:

$$0 = d_i^{NF} - d_j^{NF} + \frac{(R^2 - R_i^2)}{d_i^{NF}} - \frac{(R^2 - R_j^2)}{d_j^{NF}} \qquad (42)$$

$$= d_i^{NF} - d_j^{NF} + \frac{(R^2 - R_i^2)}{d_i^{NF}} - \frac{(R^2 - R_j^2)}{d_j^{NF}}$$

Form $R^2 - R_i^2$ and $R^2 - R_j^2$, then:

$$R^2 - R_i^2 = (X^2 + Y^2 + Z^2) - ((X - x_i)^2 + (Y - y_i)^2 + Z^2) \qquad (43)$$

$$= -\{-2Xx_i + x_i^2 - 2Yy_i + y_i^2\}$$

-continued $$R^2 - R_j^2 = -\{-2Xx_j + x_j^2 - 2Yy_j + y_j^2\} \qquad (44)$$

Collect terms in x, y, z to obtain:

$$0 = XA_{ij} + YB_{ij} + D_{ij} \qquad (45)$$

$$A_{ij} = \frac{2x_i}{d_i^{NF}} - \frac{2x_j}{d_j^{NF}} \qquad (46)$$

$$B_{ij} = \frac{2y_i}{d_i^{NF}} - \frac{2y_j}{d_j^{NF}} \qquad (47)$$

$$D_{ij} = d_i^{NF} - d_j^{NF} - \frac{x_i^2 + y_i^2}{d_i^{NF}} - \frac{x_j^2 + y_j^2}{d_j^{NF}} \qquad (48)$$

$$= d_i^{NF} - d_j^{NF} - \frac{r^2}{d_i^{NF}} + \frac{r^2}{d_j^{NF}}$$

The foregoing equations are used as follows: (1) choose i and generate a system of 5 equations using j=1 to 6, with j=i not chosen. Repeat the foregoing 6 times. Thus one obtains 6 estimates of X,Y with each estimate obtained by a best fit to the over-determined set of 5 equations for 2 unknowns.

The equations presented here are developed for the example 6 receiver pair array (18 in FIG. 1). They need only the time delays as obtained from the unwrapped phase differences versus frequency. The need for the explicit use of the angles to the transmitter T in the extraction of range is not required. However the use of angles in the phase unwrapping process is still required In a similar manner it is possible to develop equations for the range but they are susceptible to errors in the TDOAs and are effectively useless beyond a few tens of metres. The derivation is given below for the sake of completeness. Range in practice is extracted as explained above.

$$d_i = R_i - R \qquad (49)$$

$$(d_i + R)^2 = R_i^2 = (X - x_i)^2 + (Y - y_i)^2 + Z^2 \qquad (50)$$

$$(d_i + R)^2 = R^2 - 2Xx_i - 2Yy_i + r^2 \qquad (51)$$

$$r^2 = x_i^2 + y_i^2 \qquad (52)$$

When i=1, $y_1$=0 and i=4, $y_4$=0 \and $x_1 = -x_4$, then:

$$X = \frac{r^2 - d_1^2 - 2Rd_1}{2x_1} \qquad (53)$$

$$X = \frac{r^2 - d_4^2 - 2Rd_4}{2x_4} \qquad (54)$$

$$R_{14} = \frac{2r^2 - (d_1^2 + d_4^2)}{2(d_1 + d_4)} \qquad (55)$$

If the transmitter T is at a large distance (i.e., in the far field) at X=Y=0 then the following expression applies $$d_1 = d_4 = 0 \qquad (56)$$

and as expected R=∞. If the transmitter T is at any distance Y when X=Z=0, $d_1 = -d_4$ and there is no information on R. However this is not a situation that is expected to be encountered.

Similarly one can write:

$$R_{25} = \frac{2r^2 - (d_2^2 + d_5^2)}{2(d_2 + d_5)} \quad (57)$$

$$R_{36} = \frac{2r^2 - (d_3^2 + d_6^2)}{2(d_3 + d_6)} \quad (58)$$

$$d_3^2 + 2d_3R = -2Xx_3 - 2Yy_3 + r^2 \quad (59)$$

$$d_2^2 + 2d_2R = -2Xx_2 - 2Yy_2 + r^2 \quad (60)$$

As $x_3 = -x_2$ and $y_2 = y_3$ the following expression may be written:

$$Y = \frac{2r^2 - (d_3^2 + d_2^2 + 2R(d_2 + d_3))}{4y^2} \quad (61)$$

If one also considers receivers 5 and 6 one obtains the expressions:

$$d_2^2 + 2d_5R = -2Xx_5 - 2Yy_5 + r^2 \quad (62)$$

$$d_6^2 + 2d_6R = -2Xx_6 - 2Yy_6 + r^2 \quad (63)$$

As $x_5 = -x_6$ and $y_5 = y_6$ one obtains the expressions:

$$Y = \frac{2r^2 - (d_5^2 + d_6^2 + 2R(d_5 + d_6))}{4y_5} \quad (64)$$

The foregoing provides another solution for R:

$$R_{2356} = \frac{4r^2 - (d_3^2 + d_2^2 + d_5^2 + d_6^2)}{2(d_2 + d_3 + d_5 + d_6)} \quad (65)$$

In general one can write the expression:

$$d_i^2 + 2d_iR = -2Xx_i - 2Yy_i + r^2 \quad (66)$$

If and $\alpha_{ij}$ and $\beta_{ij}$ are defined as:

$$\alpha_{ij} = \frac{x_j}{y_j} - \frac{x_i}{y_i} \quad (67)$$

$$\beta_{ij} = \frac{d_i}{y_i} - \frac{d_j}{y_j} \quad (68)$$

and $$\gamma_{ij} = \frac{r^2 - d_j}{2y_j} - \frac{r^2 - d_i}{2y_i} \quad (69)$$

Then:

$$R_{ijkl} = \frac{\gamma_{kl}\alpha_{ij} - \gamma_{ij}\alpha_{kl}}{\beta_{ij}\alpha_{kl} - \beta_{kl}\alpha_{ij}} \quad (70)$$

The range R may be extracted in principle from such equations by setting up all the possible independent variations and solving by least squares optimization but the method is susceptible to errors in TDOA and the method described above as the intercept method is typically used.

In the absence of multipath arrivals with only line of sight (LOS) arrivals at the receivers, the unwrapped phase with respect to hop frequency is a straight line passing through zero at zero frequency; the slope gives the delay between any receiver pair.

In the presence of multipath arrivals, the unwrapped phase tends to be oscillatory with hop frequency around the straight line. If the hop frequency interval is small enough then this oscillatory behaviour is well described and the mean value versus hop frequency is very close to that for LOS only. If the hop frequency interval is too large then bias can manifest itself in the results. This is essentially aliasing.

Figure 3:
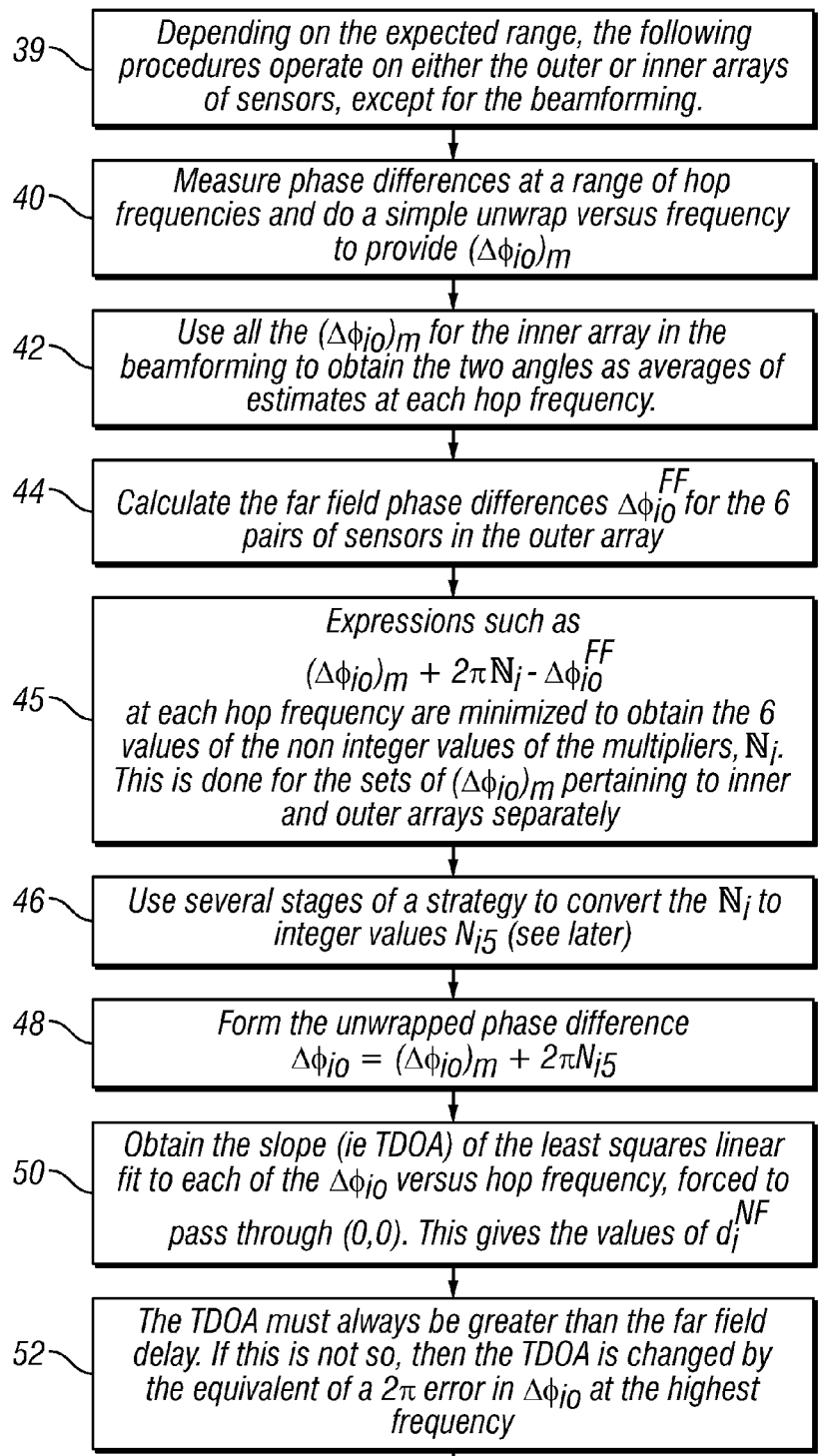
FIG. 3 is a flow chart of a method of operating the system of FIG. 1 to determine helicopter position.
Figure 3:
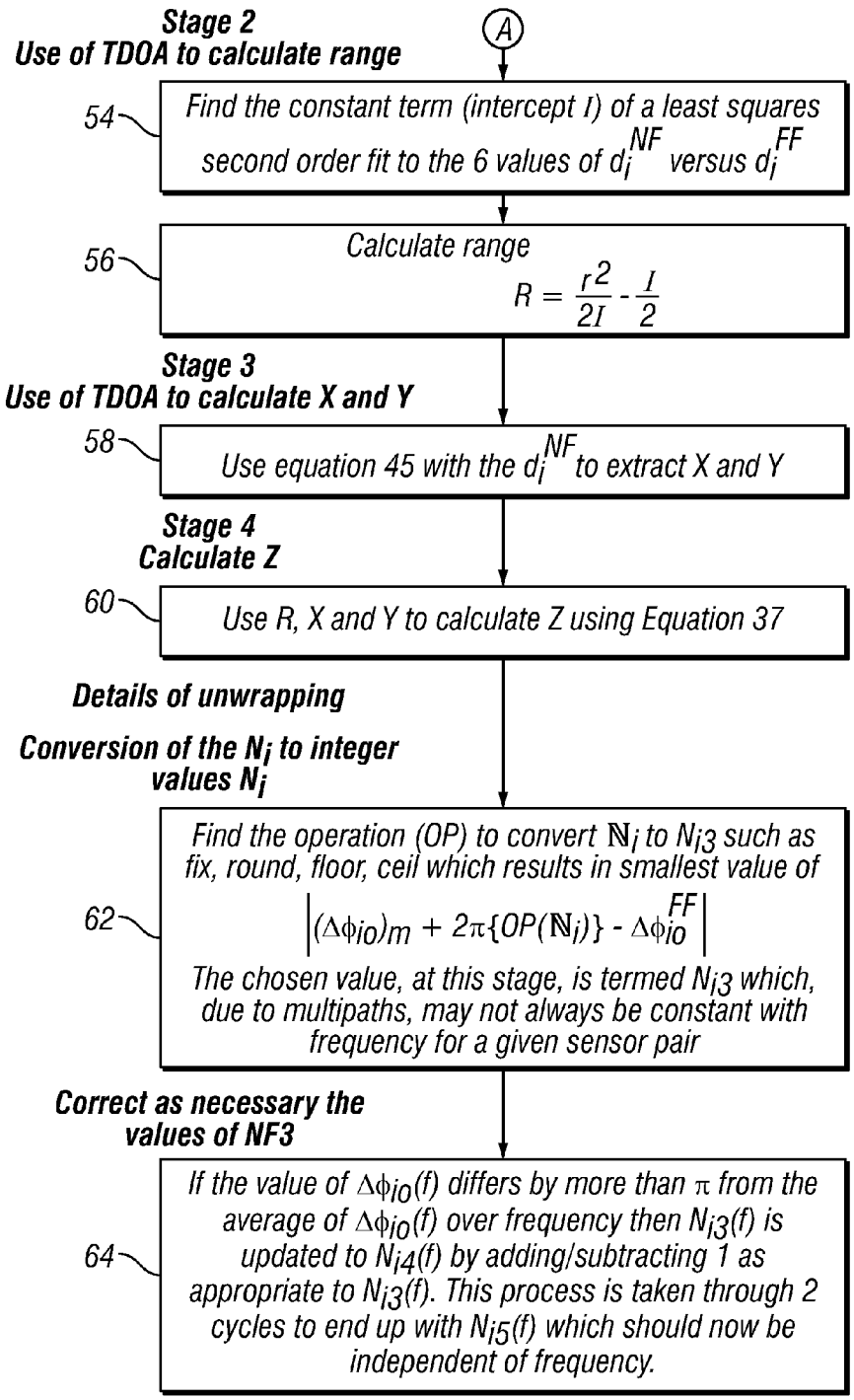

A flow chart showing implementation of the method developed in the above equations is shown in FIG. 3. Depending on the expected range, at 39, the following procedures operate on either the outer or inner arrays of sensors, except for the beamforming. A first element of the method is to calculate TDOA using phase difference with respect to frequency. At 40, phase differences are measured at a plurality of hop frequencies a simple phase unwrap versus frequency is performed to provide $(\Delta\phi_{io})_m$.

At 42, use all the determined values $(\Delta\phi_{io})_m$ for the inner array (16 in FIG. 1) in the beamforming to obtain the two angles as averages of estimates at each hop frequency.

At 44, calculate the far field phase differences $\phi_{io}^{FF}$ for the 6 pairs of sensors in the outer array (18 in FIG. 1). At 45, expressions such as $(\Delta\phi_{io})_m + 2\pi N_i - \Delta\phi_{io}^{FF}$ may be used at each hop frequency and are minimized to obtain the 6 non-integer values of the multipliers, $N_i$. This is done for the sets of $(\Delta\phi_{io})_m$ for both the inner and outer arrays separately. At 46, several stages of a strategy to are used convert the $N_i$ to integer values $N_{i5}$. At 48, form the unwrapped phase difference using the expression $\Delta\phi_{io} = \Delta\phi iom + 2\pi Ni5$. At 50, obtain the slope of the TDOA of the least squares linear fit to each of the $\Delta\phi_{io}$ versus hop frequency, forced to pass through (0,0). The foregoing procedure gives the values of $d_i^{NF}$. At 52 it is noted that the TDOA must always be greater than the far field delay. If this is not so, then the TDOA may be changed by the equivalent of a $2\pi$ shift in $\Delta\phi_{io}$ at the highest hop frequency.

At 54 find the constant term (intercept) of a least squares second order fit to the 6 values of $d_i^{NF}$ versus $d_i^{FF}$. At 56, the range is calculated using the expression $$R = \frac{r^2}{2I} - \frac{I}{2}.$$

(Eq. 33) At 58, use equation 45 with the $d_i^{NF}$ to extract the X and Y coordinates. At 60, use R, X and Y to calculate Z using Equation 36.

At 62, find the operation (OP) to convert $N_i$ to $N_{i3}$ such as fix, round, floor, ceil which results in smallest value of $|(\Delta\phi_{io})_m + 2\pi\{OP(N_i)\} - \Delta\phi_{io}^{FF}|$. The chosen value, at this stage, is termed $N_{i3}$ which, due to multipaths, may not always be constant with frequency for a given sensor pair. At 64, the values of $N_{i3}$ may be corrected. If the value of $\Delta\phi_{io}(f)$ differs by more than $\pi$ from the average of $\Delta\phi_{io}(f)$ over frequency then $N_{i3}(f)$ is updated to $N_{i4}(f)$ by adding/subtracting 1 as appropriate to $N_{i3}(f)$. This process may be taken through 2 cycles to end up with $N_{i5}(f)$, which should now be independent of frequency. Thus, the values of X,Y,Z of the helicopter with respect to a selected position on the combined array (10 in FIG. 1) may be determined, and transmitted to the helicopter (e.g., by the processor 40 in FIG. 1) to assist the pilot in guiding the helicopter to an appropriate position for safe landing proximate the combined array.

A method and apparatus for determining helicopter range, direction and elevation from a target landing array may provide for safe landing of a helicopter in low visibility conditions, enhancing safety. The proposed array including both TDOA position determination and phased array arrival angle determination may provide more accurate results that using TDOA receiver arrays.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, run on a processor, for determining position of a helicopter with respect to a combined phase difference array and phased array of receivers, the combined array including an inner array spaced at a first distance from a central receiver and an outer array spaced at a second distance from the central receiver larger than the first distance, the method comprising:

transmitting a location signal from the helicopter to the combined receiver array, the location signal including a base frequency and a plurality of hop frequencies;

determining time difference of arrival between pairs of receivers by determining phase difference with respect to frequency, the phase difference unwrapped when in excess of $2\pi$;

beamforming response of receivers in the inner array of receivers in the combined array to obtain a direction and elevation angle as an average of estimates made at each hop frequency;

calculate a far field phase difference between each pair of receivers in the outer array of receivers;

determine non-integer multipliers of $2\pi$ phase difference for phase difference with respect to frequency between pairs of receivers in both the inner array and the outer array;

convert the non-integer multipliers to integer multipliers;

determine fully unwrapped phase difference with respect to frequency for all pairs of receivers using the integer multipliers;

determine a linear least squares best fit of phase difference with respect to frequency for all pairs of receivers, wherein the linear least squares best fit is constrained to pass through zero phase at zero frequency, thus determining corrected TDOA for each pair of receivers;

determine whether the TDOA is greater than the far field delay, and if not adjust the TDOA by the equivalent of $2\pi$ change in the phase difference at the highest hop frequency;

find an intercept of a least squares fit of the TDOA versus the far field TDOA for all pairs of receivers in the outer array;

calculate a range of the helicopter from the central receiver using the intercept;

determine the horizontal distances in orthogonal directions (X,Y) from the range and determined angle;

calculate the elevation of the helicopter (Z) using the range, and X,Y;

transmit X, Y, and Z values to the helicopter.

2. The method of claim 1 further comprising correcting the values of phase difference with respect to frequency for multipath location signals detected by the receivers in the combined array.

3. The method of claim 1 wherein the location signal is in a hop frequency range of about 80 Megahertz centered on a 2.4 Gigahertz base frequency.

4. The method of claim 1 wherein beamforming the detected signals in the inner array is performed by adding a selected phase delay corresponding to selected receivers in the inner array.

* * * * *